United States Patent
Son

(10) Patent No.: US 9,088,712 B2
(45) Date of Patent: Jul. 21, 2015

(54) METHOD OF PROVIDING REFERENCE IMAGE AND IMAGE CAPTURING DEVICE TO WHICH THE METHOD IS APPLIED

(75) Inventor: Kyoung-soo Son, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 168 days.

(21) Appl. No.: 13/524,221

(22) Filed: Jun. 15, 2012

(65) Prior Publication Data

US 2013/0033633 A1 Feb. 7, 2013

(30) Foreign Application Priority Data

Aug. 3, 2011 (KR) .................. 10-2011-0077404

(51) Int. Cl.
*H04N 5/232* (2006.01)

(52) U.S. Cl.
CPC ....... H04N 5/23216 (2013.01); H04N 5/23293 (2013.01)

(58) Field of Classification Search
CPC ........................ H04N 5/23216; H04N 5/23293
USPC .............. 348/333.01, 333.02, 333.05, 333.11
See application file for complete search history.

(56) References Cited

U.S. PATENT DOCUMENTS

| | | | | |
|---|---|---|---|---|
| 5,138,460 A * | 8/1992 | Egawa | ........................... | 348/239 |
| 6,657,667 B1 * | 12/2003 | Anderson | ................. | 348/333.12 |
| 7,684,687 B2 * | 3/2010 | Furuya | ............................. | 396/88 |
| 7,714,926 B2 | 5/2010 | Kobayashi et al. | | |
| 2001/0004268 A1 * | 6/2001 | Kubo et al. | .............. | 348/333.02 |
| 2003/0076312 A1 * | 4/2003 | Yokoyama | ..................... | 345/204 |
| 2003/0090585 A1 * | 5/2003 | Anderson | ................ | 348/333.11 |
| 2007/0146526 A1 * | 6/2007 | Ozone | ........................ | 348/333.01 |
| 2008/0273110 A1 * | 11/2008 | Joza et al. | ................ | 348/333.05 |
| 2008/0297622 A1 * | 12/2008 | Miyashita | .................. | 348/229.1 |
| 2008/0297640 A1 * | 12/2008 | Honjo et al. | ............. | 348/333.05 |
| 2009/0027515 A1 * | 1/2009 | Maruyama et al. | ......... | 348/223.1 |
| 2010/0141797 A1 * | 6/2010 | Son | ................ | 348/234 |
| 2010/0149342 A1 * | 6/2010 | Sugino | ........................ | 348/169 |
| 2010/0328470 A1 * | 12/2010 | Yumiki | ..................... | 348/207.2 |
| 2011/0261244 A1 * | 10/2011 | Ogawa et al. | ............ | 348/333.01 |
| 2012/0026350 A1 * | 2/2012 | Ozone | ........................ | 348/208.4 |
| 2012/0287153 A1 * | 11/2012 | Kashima et al. | .............. | 345/629 |

FOREIGN PATENT DOCUMENTS

| | | | | |
|---|---|---|---|---|
| JP | 2005250847 A | * | 9/2005 | ................ G06T 1/00 |
| KR | 1020090026938 | | 3/2009 | |
| KR | 1020090076115 | | 7/2009 | |

OTHER PUBLICATIONS

Wikipeda—Control unit, Feb. 5, 2015, downloaded from http://en.wikipedia.org/wiki/Control_unit on Mar. 8, 2015.*

* cited by examiner

*Primary Examiner* — Timothy J Henn

(74) *Attorney, Agent, or Firm* — Staas & Halsey LLP

(57) ABSTRACT

A method of providing a reference image and an image capturing device to which the method is applied. The method includes displaying a reference image and a captured image in first and second areas, respectively, on a single display screen; and displaying a first GUI including image capturing information on the reference image on one side of the first area and a second GUI including image capturing information on the captured image on one side of the second area. A user can easily and effectively capture an image by using the reference image.

31 Claims, 14 Drawing Sheets

METHOD OF PROVIDING REFERENCE IMAGE AND IMAGE CAPTURING DEVICE TO WHICH THE METHOD IS APPLIED

CROSS-REFERENCE TO RELATED APPLICATIONS

This application claims priority under 35 U.S.C. §119(a) from Korean Patent Application No. 20011-0077404, filed on Aug. 3, 2011, in the Korean Intellectual Property Office, the contents of which are incorporated herein by reference in its entirety.

BACKGROUND OF THE INVENTION

1. Field of the Invention

The present general inventive concept relates to a method of providing a reference image and an image capturing device to which the method is applied, and more particularly, to a method of providing a reference image, in which a reference image to be compared with a captured image may be provided, and an image capturing device to which the method is applied.

2. Description of the Related Art

Users may often wish to compare a current captured image with a previous captured image while using an image capturing device.

Conventionally, to compare a captured image with a reference image, an image capturing device may display the captured image and the reference image together side by side. In this case, however, a user may not be able to properly acquire image capturing information on the captured image and the reference image. In addition, to replace the reference image with another image, the user may create a menu for replacing the reference image, and may select an image to be set as a new reference image, which is inconvenient.

Therefore, a method and device are needed to facilitate the capturing of an image using a reference image.

SUMMARY

The present general inventive concept provides a method of providing a reference image, in which a reference image and a captured image are displayed in first and second areas, respectively, and a first GUI (graphic user interface) including image capturing information on the reference image and a second GUI including image capturing information on the captured image are displayed on the sides of the first and second areas, respectively, and an image capturing device to which the method is applied.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of providing a reference image of an image capturing device, the method including displaying a reference image and a captured image in first and second areas, respectively, on a single display screen; and displaying a first GUI including image capturing information on the reference image on one side of the first area and a second GUI including image capturing information on the captured image on one side of the second area.

The first GUI may include a plurality of icons that provide the image capturing information on the reference image, and the second GUI may include a plurality of icons that provide the image capturing information on the captured image.

The displaying the first and second GUIs may include displaying one or more icons that represent differences in image capturing conditions between the reference image and the captured image.

The displaying the first and second GUIs may include displaying one or more icons that represent differences in image capturing conditions between the reference image and the captured image differently so as to be easily distinguishable from the other icons.

An image capturing mode of the image capturing device may be an 'auto' mode.

The image capturing information may include at least one of an image capturing mode, image size, resolution, information indicating whether an AF (auto-focusing) function is on, information indicating whether a flash function is on, an ISO sensitivity level, and a white balance value.

The first GUI may include a GUI which provides histogram information of the reference image, and the second GUI may include a GUI which provides histogram information of the captured image.

The method may also include, in response to a command being received from a user, making the first and second GUIs disappear from the display screen and displaying a third GUI which provides histogram information corresponding to differential values between the histogram information of the reference image and the histogram information of the captured image.

The captured image may be a live-view image which is displayed by light projected onto a lens of the image capturing device during a standby mode, or a quick-view image which is provided to a user for review after capturing of an image.

The method may also include, in response to a shutter of the image capturing device being pressed by the user with the live-view image displayed in the second area, displaying the quick-view image in the second area.

The method may also include, in response to user input being received with the quick-view image displayed in the second area, setting the quick-view image as a new reference image; and displaying the live-view image in the first area with the quick-view image displayed in the second area.

The method may also include, in response to a command being received from the user, allowing the reference image and the captured image to swap places with each other.

The method may also include cropping a portion out of one of the reference image and the captured image in response to a user's manipulation of the image capturing device; and moving the cropped image portion over to the other one of the reference image and the captured image to edit the corresponding image.

The foregoing and/or other features and utilities of the present general inventive concept may also be achieved by providing an image capturing device including an image capturing unit; a storage unit which stores a reference image; a display unit which displays the reference image and a captured image in first and second areas, respectively, on a single display screen thereof; a GUI generation unit which generates one or more GUIs; and a control unit which controls the GUI generation unit and the display unit to generate and display, respectively, a first GUI including image capturing information on the reference image on one side of the first area and a second GUI including image capturing information on the captured image on one side of the second area.

The first GUI may include a plurality of icons that provide the image capturing information on the reference image, and the second GUI may include a plurality of icons that provide the image capturing information on the captured image.

The control unit may control the display unit to display one or more icons that represent differences in image capturing conditions between the reference image and the captured image.

The control unit may control the display unit to display one or more icons that represent differences in image capturing conditions between the reference image and the captured image differently so as to be easily distinguishable from the other icons.

An image capturing mode of the image capturing device may be an 'auto' mode.

The image capturing information may include at least one of an image capturing mode, image size, resolution, information indicating whether an AF function is on, information indicating whether a flash function is on, an ISO sensitivity level, and a white balance value.

The first GUI may include a GUI which provides histogram information of the reference image, and the second GUI may include a GUI which provides histogram information of the captured image.

In response to a command being received from a user, the control unit may make the first and second GUIs disappear from the display screen and may control the GUI generation unit and the display unit to generate and display, respectively, a third GUI which provides histogram information corresponding to differential values between the histogram information of the reference image and the histogram information of the captured image.

The captured image may be a live-view image which is displayed by light projected onto a lens of the image capturing device during a standby mode, or a quick-view image which is provided to a user for review after capturing of an image.

In response to a shutter of the image capturing device being pressed by the user with the live-view image displayed in the second area, the control unit may display the quick-view image in the second area.

In response to user input being received with the quick-view image displayed in the second area, the control unit may set the quick-view image as a new reference image and may control the display unit to display the live-view image in the first area with the quick-view image displayed in the second area.

In response to a command being received from the user, the control unit may control the display unit to allow the reference image and the captured image to swap places with each other.

The control unit may crop a portion out of one of the reference image and the captured image in response to a user's manipulation of the image capturing device, and may move the cropped image portion over to the other one of the reference image and the captured image to edit the corresponding image.

The foregoing and/or other features and utilities of the present general inventive concept may also be achieved by providing an image capturing device that includes: an image capturing unit to capture an image; a display unit which displays a reference image and a captured image in respective first and second adjacent areas of the display unit; and a control unit which controls generation of a first GUI including image capturing information on the reference image on one side of the first area and generation of a second GUI including image capturing information on the captured image on one side of the second area.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
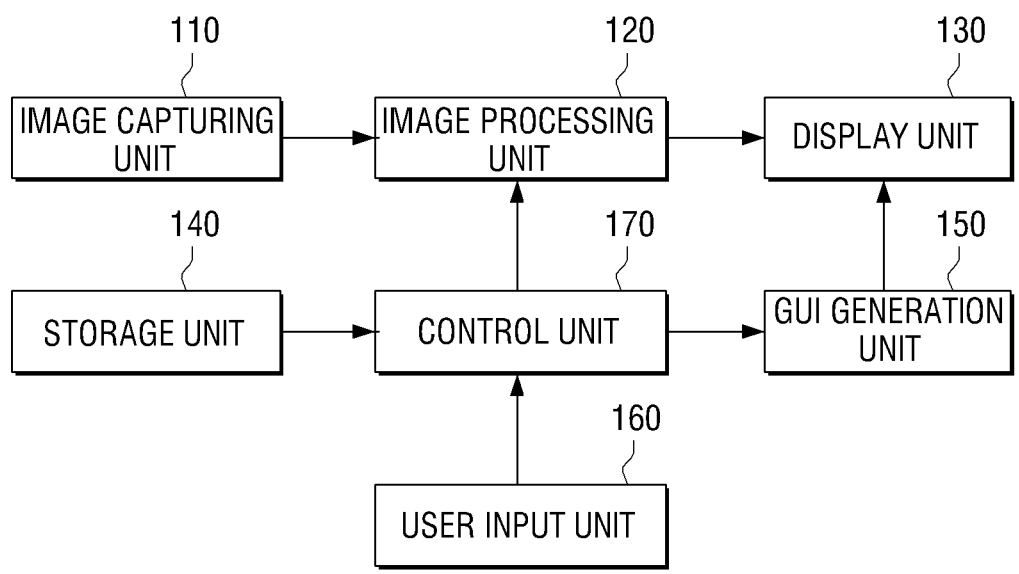
FIG. 1 is a block diagram of an image capturing device according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image capturing device 100. Referring to FIG. 1, the image capturing device 100 includes an image capturing unit 110, an image processing unit 120, a display unit 130, a storage unit 140, a GUI (graphic user interface) generation unit 150, a user input unit 160, and a control unit 170.

The image capturing unit 110 may include a shutter (not shown), a lens module (not shown), a diaphragm (not shown), and a CCD (charge-coupled device, not shown), and an ADC (analog-to-digital converter, not shown). The shutter may adjust the amount of light exposure with the aid of the diaphragm. The lens module may receive light from an external light source, and may process an image. The amount of incident light may be adjusted according to the degree to which the diaphragm is open or closed. The CCD may accumulate light incident thereupon via the lens module, and may output an image captured by the lens module based on the accumulated light in synchronization with a vertical synchronization signal. The capturing of an image by the image capturing device 110 may be performed by the CCD, which converts light reflected from a subject into an electrical signal. To obtain a color image using the CCD, color filters or a CFA (color filter array) may be needed. In a CFA, a plurality of color filters are arranged regularly, and each of the color filters enables one color to be penetrated into a pixel. The shape of a CFA may vary depending on how the color filters are arranged therein. The ADC may convert an analog image signal that is output by the CCD into a digital signal.

The image processing unit 120 may perform signal processing on RAW data, which is digitalized under the control of the control unit 170, such that the data may be displayed. The image processing unit 120 may remove a black level, which may result from a dark current that may be generated in the CCD and a CFA that are sensitive to variations in temperature. The image processing unit 120 may perform gamma correction, which involves encoding information in consideration of the nonlinearity of the human vision. The image processing unit 120 may perform CFA interpolation, by which a Bayer pattern including RGRG lines and GBGB lines of gamma-corrected data may be interpolated into RGB lines. The image processing unit 120 may convert interpolated R (red), G (green), and B (blue) signals into Y, U, and V signals, may perform edge compensation, which increases the sharpness of an image, by filtering the Y signal with the aid of a high pass filter, may perform color correction, by which the color values of the U and V signals are corrected, using a standard color coordinate system, and may remove noise from the resulting Y, U, and V signals. The image processing unit 120 may generate a JPEG file by compressing and performing signal processing on the noise-removed Y, U, and V signals. The JPEG signal may be displayed by the display unit 130, and may be stored in the storage unit 140.

The display unit 130 may display image data provided by the image processing unit 120 or image data stored in the storage unit 140. The display unit 130 may display one or more GUIs generated by the GUI generation unit 150.

The display unit 130 may display a reference image and a captured image together on a single display screen under the control of the control unit 170. The reference image may be an image that may be referenced by the user in connection with the captured image. For example, the reference image may be one of an image selected from a menu by the user, an image captured prior to the captured image, an image having the same GPS (global positioning system) information as the captured image, and an image captured in the same image capturing mode as the captured image.

For example, the captured image may be a live-view image that is displayed by light projected onto the lens module during a standby mode or a quick-view image that may be provided for review after the capturing of an image.

The storage unit 140 may store various programs and data to drive the image capturing device 100. The storage unit 140 may also store image data processed by the image processing unit 120.

The GUI generation unit 150 may generate a GUI in the form of an OSD (on screen display) under the control of the control unit 170. More specifically, the GUI generation unit 150 may generate one or more GUIs to provide image capturing information on the reference image and/or image capturing information on the captured image. For example, the GUI generation unit 150 may generate a plurality of icons representing image capturing information on the reference image and image capturing information on the captured image as GUIs.

The user input unit 160 may receive a command from the user. For example, the user input unit 160 may be implemented as a shutter, a button, or a touch screen provided on the exterior of the image capturing device 100.

The control unit 170 may control the general operation of the image capturing device 100 in accordance with a command that is received via the user input unit 160. For example, in response to a predetermined command being received from the user, the control unit 170 may control the display unit 130 to display the reference image and the captured image in first and second areas, respectively, on the screen thereof. In this example, the control unit 170 may also control the display unit 130 to resize the reference image and the captured image.

The control unit 170 may control the display unit 130 to display a first GUI including image capturing information on the reference image on one side of the first area where the reference image is displayed and to display a second GUI including image capturing information on the captured image on one side of the second area where the captured image is displayed.

Figure 2A:
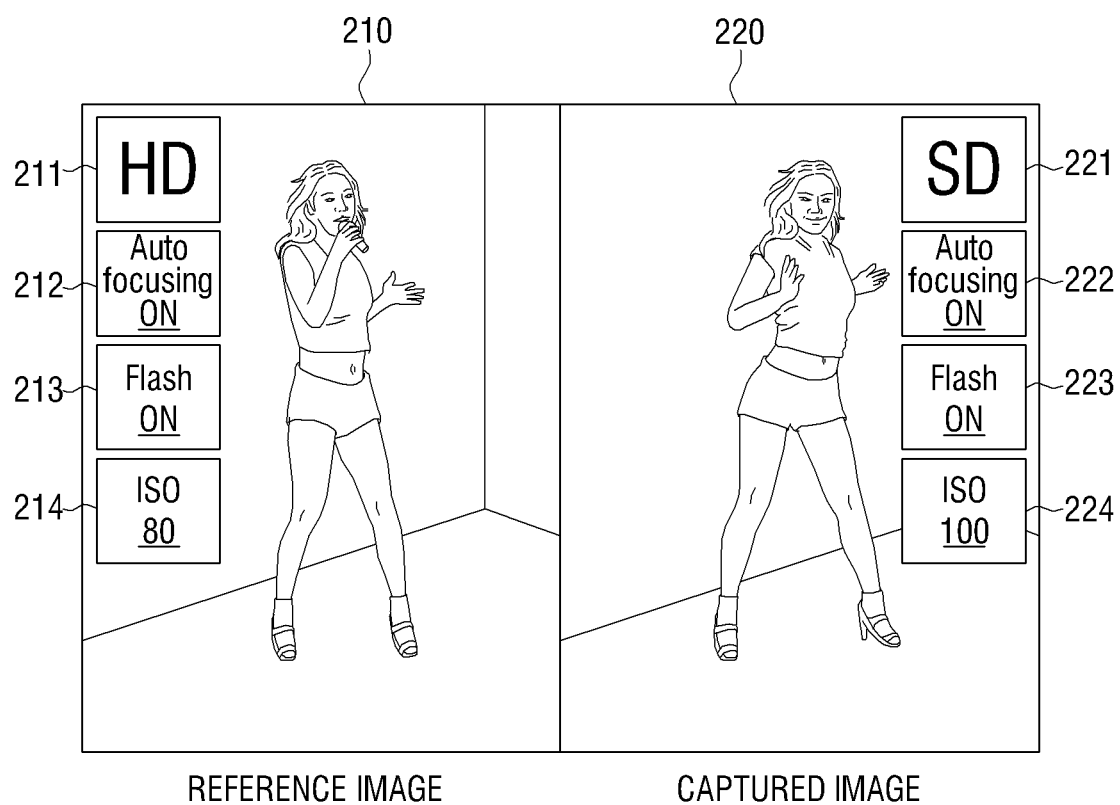
FIGS. 2A through 2C are diagrams illustrating examples of displaying a plurality of icons to provide image capturing information on a reference image and image capturing information on a captured image.

More specifically, referring to FIG. 2A, the control unit 170 may display a plurality of icons 211 through 214 that provide image capturing information on a reference image on the left side of a first area 210 in which the reference image is displayed, and may display a plurality of icons 221 through 224 that provide image capturing information on a captured image on the right side of a second area in which the captured image is displayed.

For example, the icons 211 and 221 may be resolution icons that provide resolution information of the reference image and of the captured image, respectively, the icons 212 and 222 may be AF (auto-focusing) icons that provide AF information of the reference image and of the captured image, respectively, the icons 213 and 223 may be flash icons that indicate whether a flash function is on or off, and the icons 214 and 224 may be ISO (International Organization for Standard) icons that provide ISO information of the reference image and of the captured image, respectively, but there is no restriction to the type of image capturing information that may be displayed as an icon by the control unit 170. That is, the control unit 170 may display various icons other than those set forth herein such as, for example, an icon indicating the size of an image, an icon indicating an image capturing mode, an icon indicating whether a white balance function is on, and the like.

Image capturing information on a reference image and on a captured image may be acquired from one or more icons that are displayed by the control unit 170. For example, referring to FIG. 2A, the icons 211 through 214 indicate that the reference image in the first area 210 has an HD (high definition) resolution and an ISO sensitivity level of 80 and is captured with both an AF function and a flash function on, and the icons 221 through 224 indicate that the captured image in the second area 220 has an SD (standard definition) resolution and an ISO sensitivity level of 100 and is captured with both the AF function and the flash function on.

As described above, a plurality of icons that provide image capturing information on a reference image and image capturing information on a captured image may be displayed on the sides of areas in which the reference image and the captured image are respectively displayed. Therefore, it is possible for a user to easily identify the image capturing information on the reference image and the image capturing information on the captured image.

The control unit 170 may display whichever of the icons 211 through 214 and 221 through 224 correspond to differences in image capturing conditions between the reference image in the first area 210 and the captured image in the second area 220 differently so that the corresponding icons may become easily distinguishable.

Figure 2B:
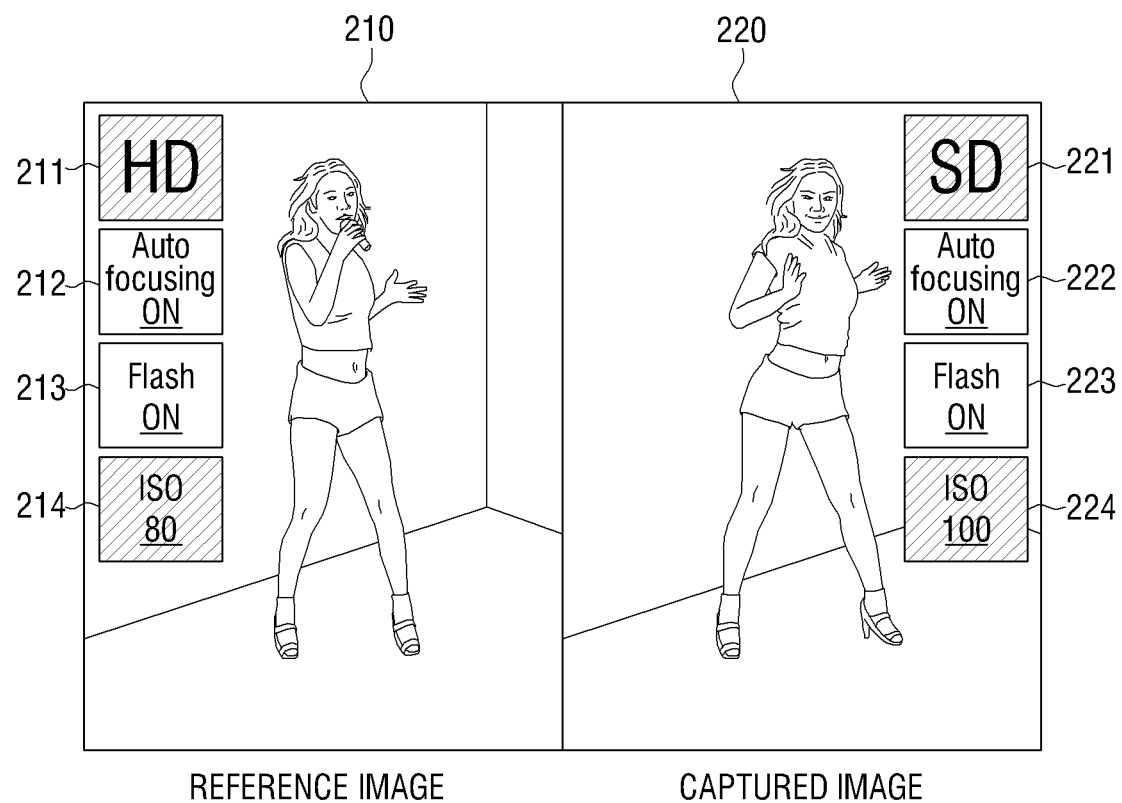

For example, referring to FIG. 2B, in a case in which the reference image in the first area 210 and the captured image in the second area 220 have different resolutions and different ISO sensitivity levels, the control unit 170 may highlight the resolution icons 211 and 221 and the ISO icons 214 and 224.

However, there is no restriction on how to display icons corresponding to differences in image capturing conditions between a reference image and a captured image differently. For example, the control unit 170 may display icons corresponding to common image capturing conditions shared between a reference image and a captured image semi-transparently.

The control unit 170 may display only icons corresponding to differences in image capturing conditions between a reference image and a captured image differently.

Figure 2C:
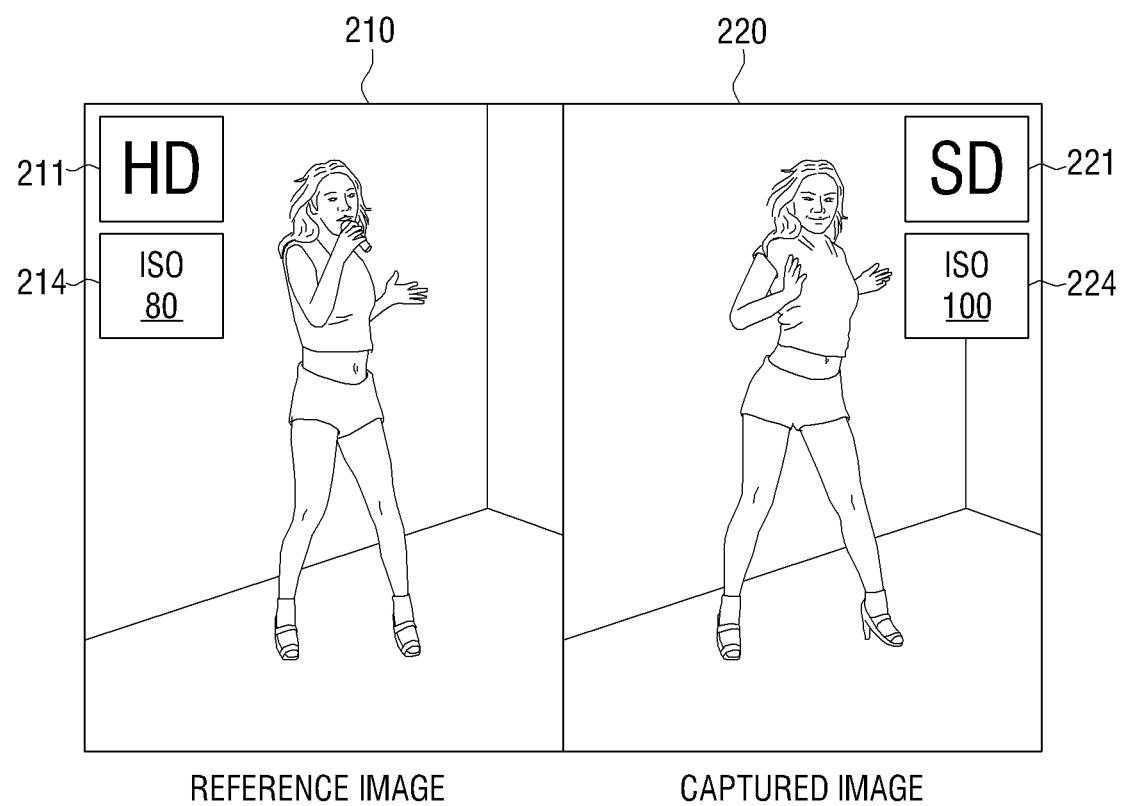

For example, referring to FIG. 2C, the control unit 170 may control the display unit 130 to display only the icons 211 and 221 and the ISO icons 214 and 224, since these icons are ones including differences in image capturing conditions between the reference image and the captured image. However, other icons may be displayed depending on the settings of the icons to include differences in the image capturing conditions.

As described above with reference to FIGS. 2B and 2C, icons corresponding to differences in image capturing conditions between a reference image and a captured image may be displayed differently so as to be easily distinguishable from other icons so that a user may easily identify any differences between the reference image and the captured image. Therefore, the user may set the same image capturing conditions as those for the reference image to capture a new image.

In a case where a current image capturing mode of the image capturing device 100 is an 'auto' mode, image capturing conditions facing the image capturing device 100 may change according to the surroundings of the image capturing device 100. For example, in the 'auto' mode, image capturing conditions in an indoor environment may be different from image capturing conditions in an outdoor environment. That is, image capturing conditions may vary from one environment to another environment even in the same operating mode of the image capturing device 100.

Therefore, as described above, it is possible to easily identify image capturing conditions that may vary even in the same operating mode of the image capturing device 100 by displaying a plurality of icons that provide image capturing information on a reference image and image capturing information on a captured image.

In response to one of the icons 211 through 214 and 221 through 224 being selected via the user input unit 160, the user input unit 160 (such as, for example, a touch screen) may control the GUI generation unit 150 and the display unit 130 to generate and display, respectively, a menu to set an image capturing condition corresponding to the selected icon. For example, in a case in which the resolution icon 221 is selected via the user input unit 160, the control unit 170 may generate a menu to set resolution, and may display the generated menu.

In response to the menu to set the image capturing condition corresponding to the selected icon, the control unit 170 may adjust the image capturing condition corresponding to the selected icon. For example, in a case in which a menu to set resolution is displayed, the control unit 170 may decide whether to set the resolution of the captured image in the second area 220 to SD, HD, or full HD resolution. For example, the control unit 170 may set the resolution of the captured image in the second area 220 to HD resolution to be in conformity with the resolution of the reference image in the first area 210, and may control the display unit 130 to display an icon indicating that the captured image in the second area 220 is set to HD resolution as the resolution icon 221.

The control unit 170 may generate and display an icon to set image capturing conditions to be identical for both the reference image in the first area 210 and the captured image in the second area 220.

In the examples illustrated in FIGS. 2A through 2C, the icons 211 through 214 may be displayed on the left side of the first area 210, and the icons 221 through 224 may be displayed on the right side of the second area 220. In another non-limiting example, the icons 211 through 214 may be displayed at the bottom of the first area 210, and the icons 221 through 224 may be displayed at the bottom of the second area 220.

In the examples illustrated in FIGS. 2A through 2C, the icons 211 through 214 and 221 through 224 may represent image capturing information as text. In another non-limiting example, the icons 211 through 214 and 221 through 224 may represent image capturing information as images. For example, each of the flash icons 213 and 223 may display a lighting icon to indicate whether the flash function is on or off.

The control unit 170 may set the captured image in the second area 220 as a new reference image, and may display the new reference image in the first area 210. In this example, the new reference image may be a live-view image that may be displayed by light projected onto the lens module of the image capturing device 100 during a standby mode or a quick-view image that may be provided for review after the capturing of an image.

Figure 3A:
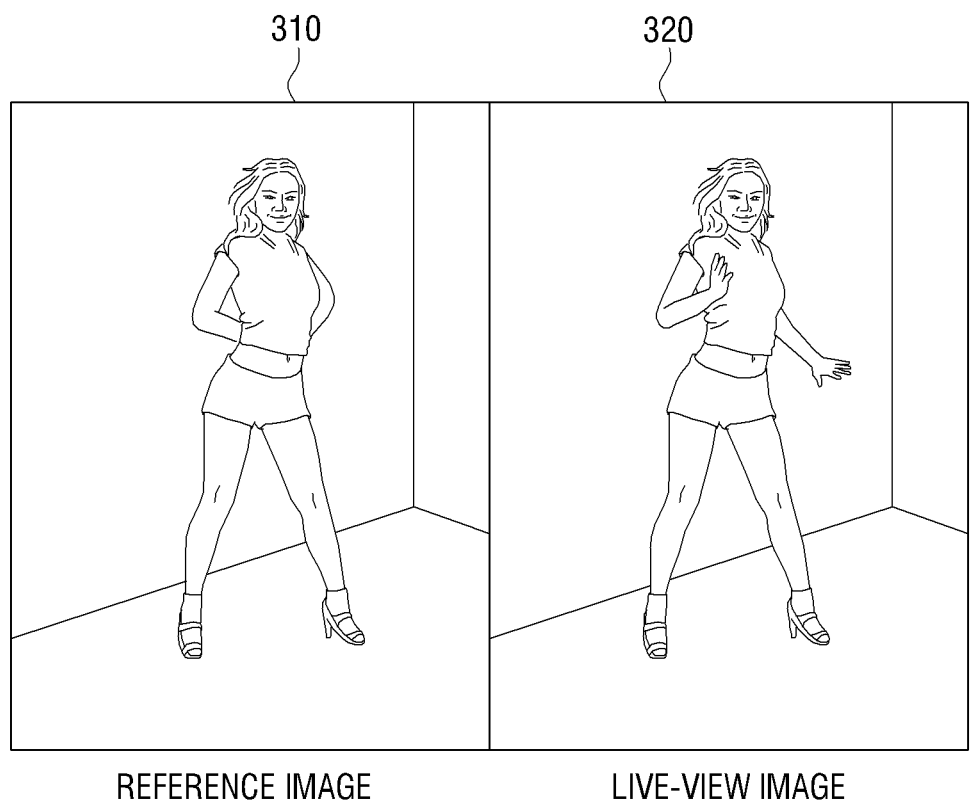
FIGS. 3A through 3D are diagrams illustrating examples of setting a live-view image or a quick-view image as a reference image.

For example, referring to FIG. 3A, a reference image 310 may be displayed on the left side of a display screen, and a live-view image 320 may be displayed on the right side of the display screen. In this example, in response to a shutter being pressed by a user, the control unit 170 may control the display unit 130 to display a quick-view image 330 to be displayed on the right side of the display screen, as shown in FIG. 3B.

Figure 3B:
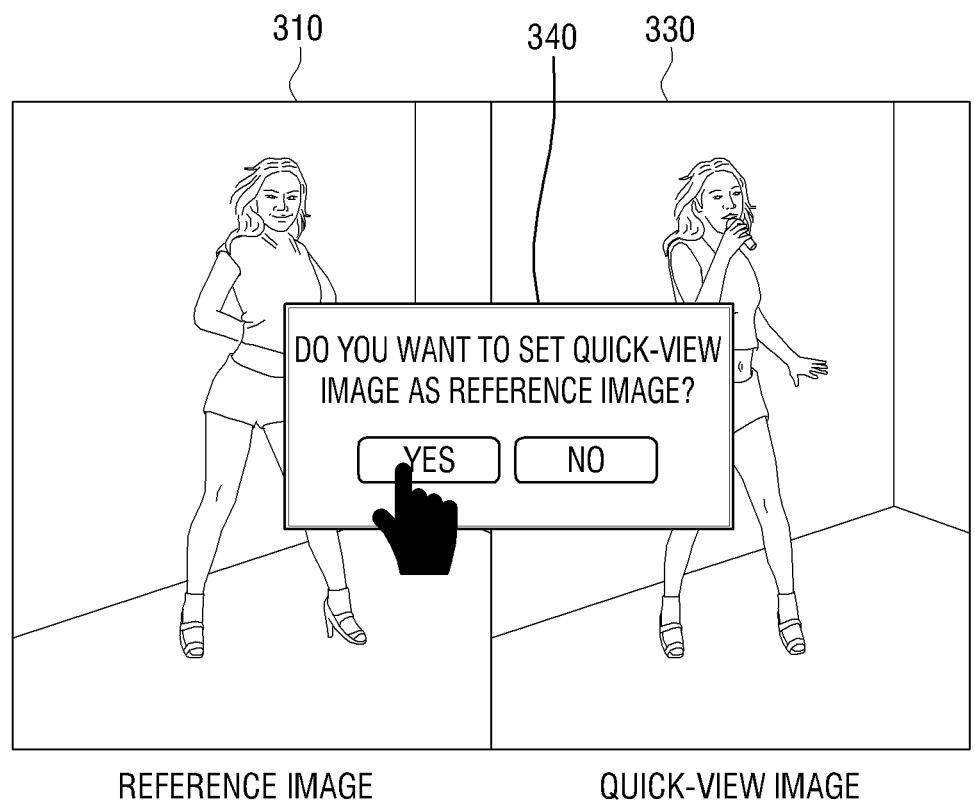

Referring to FIG. 3B, in response to a command being received from the user via the user input unit 160, for example, in response to an area in which the quick-view image 330 is displayed being touched for more than a predefined amount of time by the user, the control unit 170 may control the GUI generation unit 150 and the display unit 130 to generate and display, respectively, a GUI 340 to set a new reference image, including a message that says "Do you want to set the quick-view image as a reference image?"

Figure 3C:
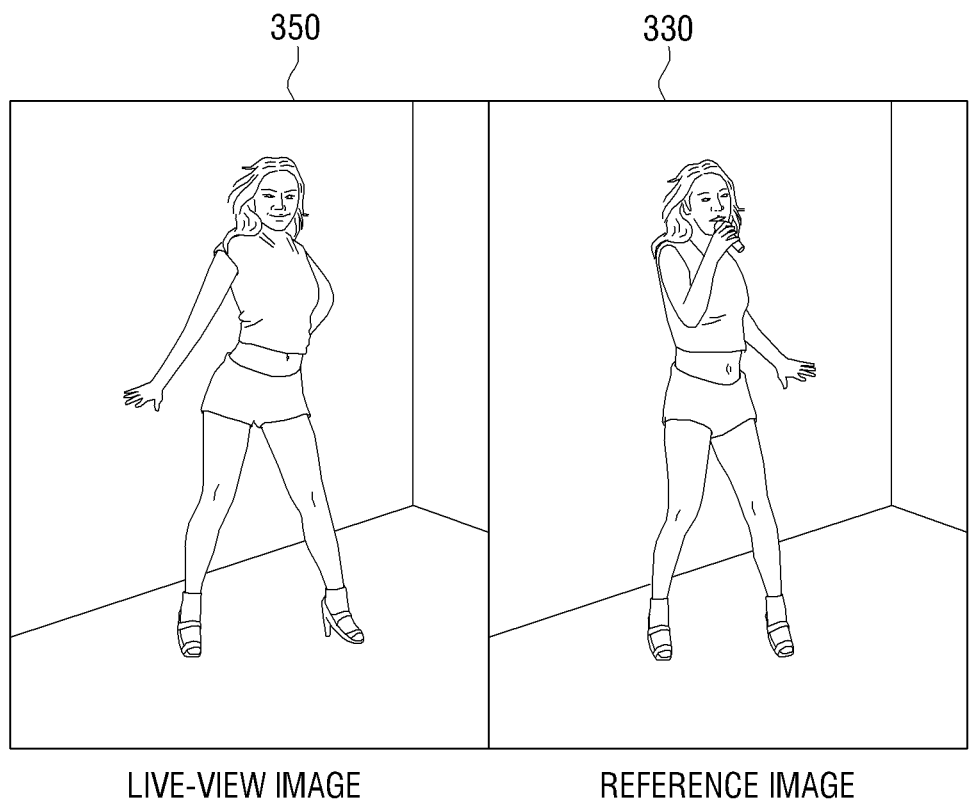

Referring to FIGS. 3B and 3C, in a case in which the quick-view image 330 is set as a new reference image, the control unit 170 may control the display unit 130 to display the new reference image 330 on the right side of the display screen and a live-view image 350 on the left side of the display screen.

Figure 3D:
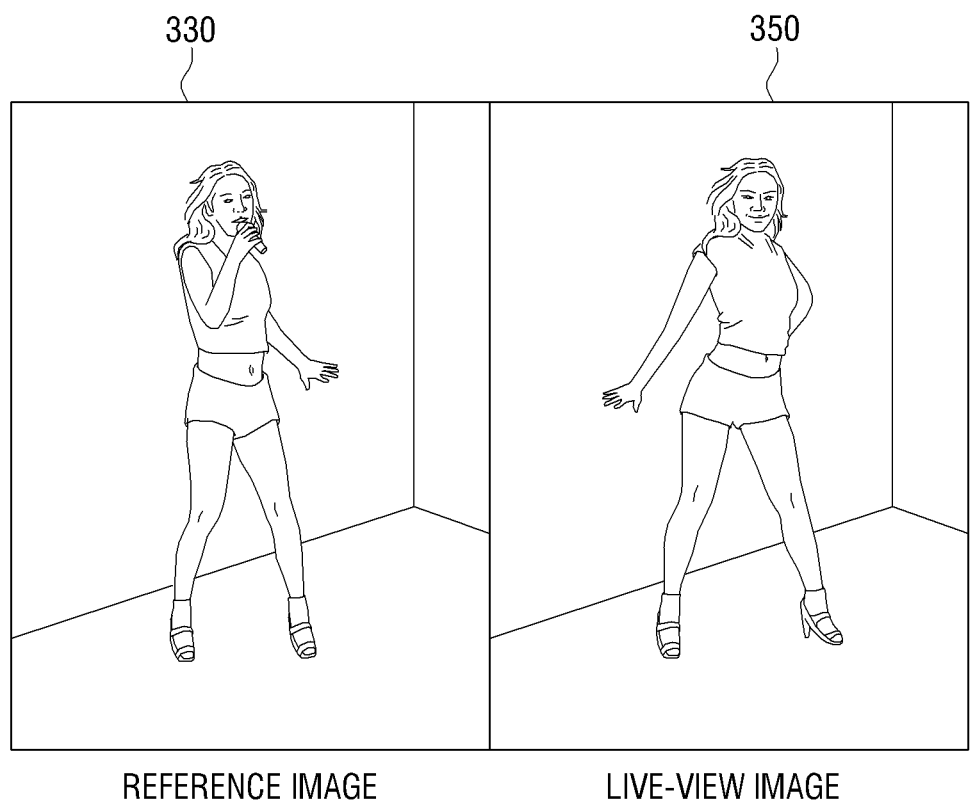

Referring to FIG. 3D, in response to a command being received from the user via the user input unit 160, for example, in response to the new reference image 330 being touched and then dragged to the left, the control unit 170 may control the display unit 130 to display the new reference image 330 on the left side of the display screen and the live-view image 350 on the right side of the display screen.

In the examples illustrated in FIGS. 3A through 3D, a quick-view image may be set as a reference image. In another non-limiting example, a live-view image may also be set as a reference image.

The control unit 170 may display histogram information on a reference image and on a captured image. For example, the histogram information may include a histogram regarding luminance or a histogram regarding R, G, and B components.

Figure 4A:
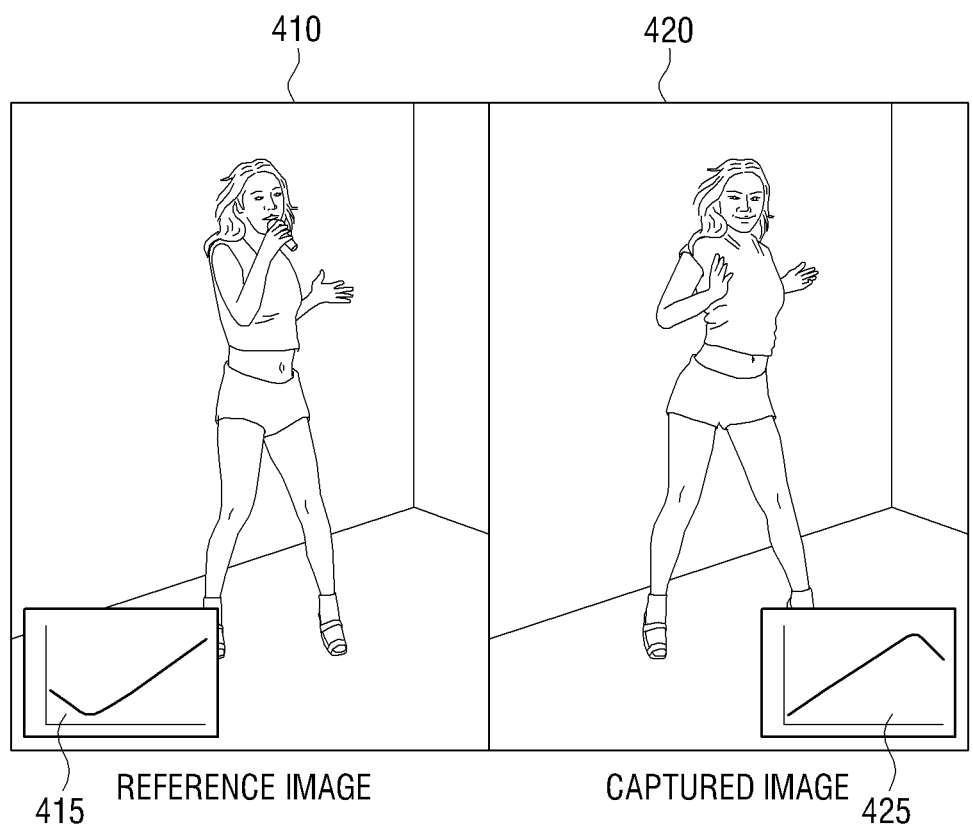
FIGS. 4A and 4B are diagrams illustrating examples of displaying histograms that provide image capturing information on a reference image and image capturing information on a captured image.

More specifically, referring to FIG. 4A, the control unit 170 may display a histogram 415 representing luminance information of a reference image on the lower left side of a first area 410 in which the reference image is displayed, and may display a histogram 425 representing luminance information of a captured image on the lower right side of a second area 420 in which the captured image is displayed.

Figure 4B:
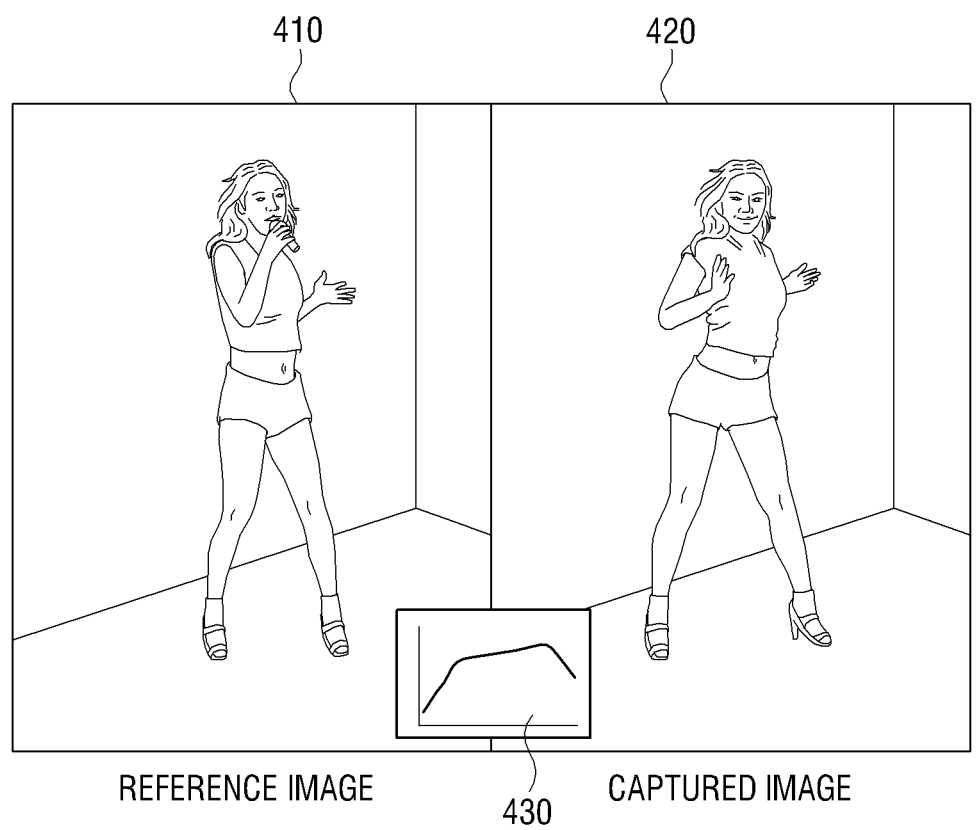

Referring to FIG. 4B, in response to a command being received from the user, the control unit 170 may control the display unit 130 to display a differential histogram 430 representing differential values between the luminance information of the reference image and the luminance information of the captured image. In this example, the control unit 170 may control the display unit 130 to make the histograms 415 and 425 disappear from the display screen.

As described above with reference to FIGS. 4A and 4B, two histograms for a reference image and for a captured image and a differential histogram representing differential values between data represented by the two histograms may be displayed. Accordingly, it is possible for a user to effectively compare the reference image and the captured image.

The control unit 170 may edit a reference image or a captured image according to the user's manipulation of the user input unit 160 by cropping a portion out of one of the reference image and the captured image and editing the other image using the cropped portion.

Figure 5A:
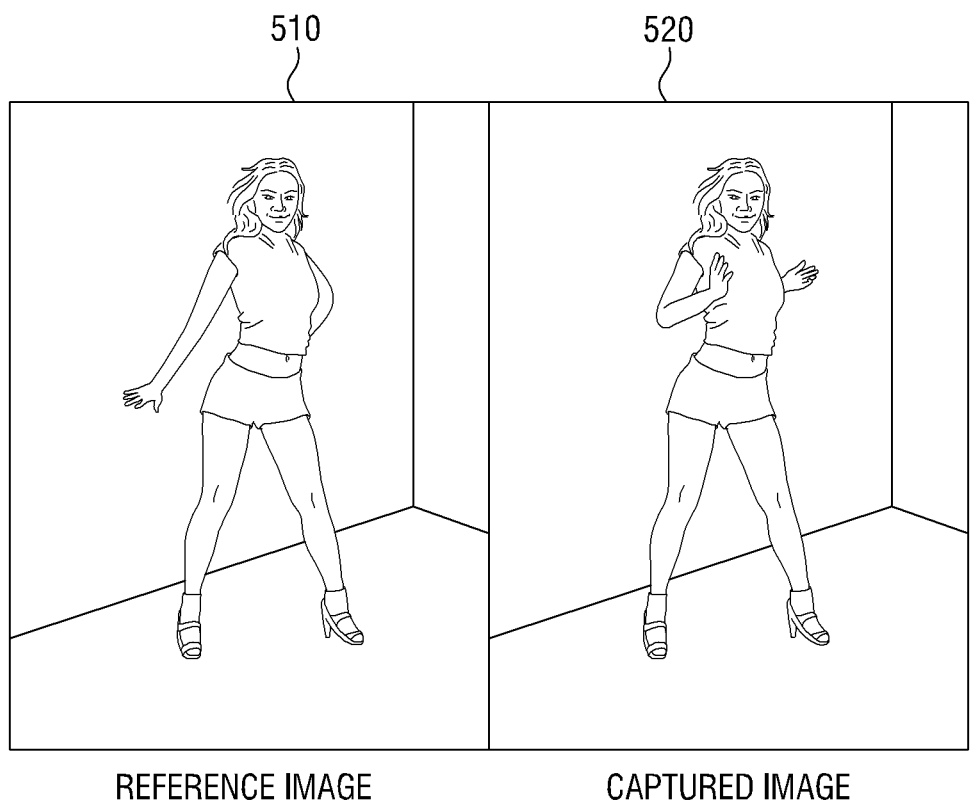
FIGS. 5A through 5C are diagrams illustrating examples of cropping a portion out of a reference image or a captured image and editing the reference image or the captured image using the cropped portion.

For example, referring to FIG. 5A, a reference image 510 may be displayed on the left side of a display screen, and a captured image 520 may be displayed on the right side of the display screen. In this example, in response to a command from the user being detected from a portion of the reference image 510 or the captured image 520, for example, in response to a portion of the reference image 510 being dragged, the control unit 170 may crop the selected or dragged image portion out of the reference image 510, and may edit the captured image 520 by moving the cropped image portion over to the captured image 520.

Figure 5B:

Referring to FIG. 5B, in a case in which a left portion 515 of the reference image 510 is cropped and is then moved to the left side of the captured image 510, the left portion 515 of the reference image 510 may be combined with a right portion 525 of the captured image 520, and may be displayed together with the right portion 525 of the captured image 520 as a single image.

Figure 5C:

Referring to FIG. 5C, in a case in which a portion 517 of the reference image 510 rendering the upper half of the body of the subject is cropped and is then moved over to a corresponding part of the captured image 510, the cropped image portion 517 may be combined with the captured image 510 by replacing a corresponding portion of the captured image 510.

Various parts of a reference image, other than those set forth in the examples illustrated in FIGS. 5B and 5C, may be cropped to be combined with a captured image. For example, a right portion of a reference image may be cropped, and may be combined with a captured image by replacing a corresponding portion of the captured image.

In the examples illustrated in FIGS. 5B and 5C, a portion of a reference image may be cropped, and may be combined with a captured image by replacing a corresponding portion of the captured image. In another non-limiting example, a portion of a captured image may be cropped, and may be combined with a reference image by replacing a corresponding portion of the reference image.

As described above with reference to FIGS. 5A through 5C, it is possible for a user to effectively compare a reference image and a captured image by cropping a portion out of one of the reference image and the captured image and editing the reference image and/or the captured image using the cropped portion.

Figure 6:
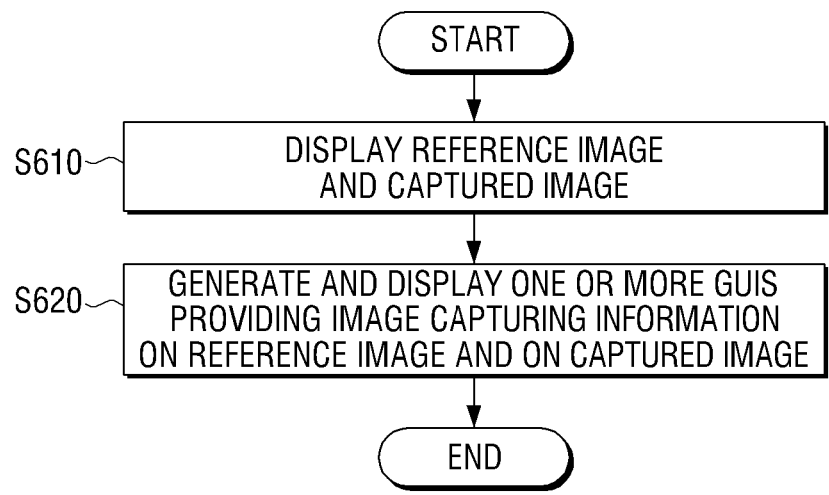
FIG. 6 is a flowchart illustrating a method of providing a reference image of an image capturing device, according to an embodiment of the present inventive concept.

FIG. 6 is a flowchart illustrating a method of providing a reference image of the image capturing device 100, according to an embodiment of the present inventive concept.

Referring to FIG. 6, in S610, the image capturing device 100 may display a reference image and a captured image on a display screen. For example, the image capturing device 100 may display a reference image in a first area on the display screen and a captured image in a second area on the display screen. For example, the reference image may be at least one of an image selected from a menu by a user, an image captured ahead of the captured image, an image having the same GPS information as the captured image, and an image having the same image capturing mode as the captured image. For example, the captured image may be a live-view image that is displayed by light projected onto the lens module of the image capturing device 100 during a standby mode or a quick-view image that may be provided for review after the capturing of an image.

In S620, the image capturing device 100 may generate and display one or more GUIs to provide image capturing information on the reference image and on the captured image. For example, the image capturing device 100 may display a first GUI to provide the image capturing information on the reference image on one side of the first area and a second GUI to provide the image capturing information on the captured image on one side of the second area. For example, each of the first and second GUIs may include a plurality of icons that represent the image capturing information on the reference image or on the captured image. For example, the term 'image capturing information' indicates, but is not limited to, the size and the resolution of an image, information indicating whether an AF function is on, information indicating whether a flash function is on, an ISO sensitivity level, a white balance value, and the like.

As described above, one or more GUIs to provide image capturing information on a reference image and on a captured image may be displayed on the sides of the reference image and the captured image. Accordingly, it is possible for a user to easily identify the image capturing information on the reference image and on the captured image from the GUIs, and thus to effectively compare the reference image and the captured image and capture another image with reference to the reference image.

In the examples illustrated in FIGS. 2A through 5C, a reference image and a captured image may be displayed side by side horizontally on a single display screen, but there is no restriction to the manner in which a reference image and a captured image are displayed. For example, a reference image and a captured image may be displayed adjacent to each other vertically on a single display screen.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of providing a reference image of an image capturing device, the method comprising:

displaying a reference image and a captured image, taken under different image capture conditions, in first and second areas, respectively, on a single display screen; and displaying a first GUI including image capturing information regarding the reference image on one side of the first area and a second GUI including image capturing information regarding the captured image on one side of the second area, wherein the first and second GUI indicate differing image capturing conditions between the reference image and the captured image, wherein the displaying the first and second GUIs comprises displaying one or more icons that represent differing image capturing conditions between the reference image and the captured image without displaying one or more icons that represent identical image capturing conditions between the reference image and the captured image.

2. The method of claim 1, wherein the first GUI includes a plurality of icons that provide the image capturing information on the reference image and the second GUI includes a plurality of icons that provide the image capturing information on the captured image.

3. The method of claim 2, wherein the displaying the first and second GUIs comprises displaying the one or more icons that represent the differing image capturing conditions between the reference image and the captured image differently so as to be easily distinguishable from the other icons.

4. The method of claim 1, wherein an image capturing mode of the image capturing device is an 'auto' mode.

5. The method of claim 1, wherein the image capturing information includes at least one of an image capturing mode, image size, resolution, information indicating whether an AF (auto-focusing) function is on, information indicating whether a flash function is on, an ISO sensitivity level, and a white balance value.

6. The method of claim 1, wherein the first GUI includes a GUI which provides histogram information of the reference image and the second GUI includes a GUI which provides histogram information of the captured image.

7. The method of claim 6, further comprising:
in response to a command being received from a user, making the first and second GUIs disappear from the display screen and displaying a third GUI which provides histogram information corresponding to differential values between the histogram information of the reference image and the histogram information of the captured image.

8. The method of claim 1, wherein the captured image is a live-view image which is displayed by light projected onto a lens of the image capturing device during a standby mode, or a quick-view image which is provided to a user for review after capturing of an image.

9. The method of claim 8, further comprising:
in response to a shutter of the image capturing device being pressed by the user with the live-view image displayed in the second area, displaying the quick-view image in the second area.

10. The method of claim 9, further comprising:
in response to user input being received with the quick-view image displayed in the second area, setting the quick-view image as a new reference image; and
displaying the live-view image in the first area with the quick-view image displayed in the second area.

11. The method of claim 10, further comprising:
in response to a command being received from the user, allowing the reference image and the captured image to swap places with each other.

12. The method of claim 1, further comprising:
cropping a portion out of one of the reference image and the captured image in response to a user's manipulation of the image capturing device; and
moving the cropped image portion over to the other one of the reference image and the captured image to edit the corresponding image.

13. An image capturing device comprising:
an image capturing unit;
a storage unit which stores a reference image;
a display unit which displays the reference image and a captured image, taken under different image capture conditions, in first and second areas, respectively, on a single display screen thereof;
on-screen display ("OSD") unit which generates one or more GUIs; and
a control unit which controls the OSD unit and the display unit to generate and display, respectively, a first GUI including image capturing information regarding the reference image on one side of the first area and a second GUI including image capturing information regarding the captured image on one side of the second area,
wherein the first and second GUI indicate differing image capturing conditions between the reference image and the captured image,
wherein the control unit further controls the display unit to display one or more icons that represent differing image capturing conditions between the reference image and the captured image without displaying one or more first and second icons that represent identical image capturing conditions between the reference image and the captured image.

14. The image capturing device of claim 13, wherein the first GUI includes a plurality of icons that provide the image capturing information on the reference image and the second GUI includes a plurality of icons that provide the image capturing information on the captured image.

15. The image capturing device of claim 14, wherein the control unit controls the display unit to display the one or more icons that represent the differing image capturing conditions between the reference image and the captured image differently so as to be easily distinguishable from the other icons.

16. The image capturing device of claim 13, wherein an image capturing mode of the image capturing device is an 'auto' mode.

17. The image capturing device of claim 13, wherein the image capturing information includes at least one of an image capturing mode, image size, resolution, information indicating whether an AF function is on, information indicating whether a flash function is on, an ISO sensitivity level, and a white balance value.

18. The image capturing device of claim 13, wherein the first GUI includes a GUI which provides histogram information of the reference image and the second GUI includes a GUI which provides histogram information of the captured image.

19. The image capturing device of claim 18, wherein, in response to a command being received from a user, the control unit makes the first and second GUIs disappear from the display screen and controls the OSD unit and the display unit to generate and display, respectively, a third GUI which provides histogram information corresponding to differential values between the histogram information of the reference image and the histogram information of the captured image.

20. The image capturing device of claim 13, wherein the captured image is a live-view image which is displayed by light projected onto a lens of the image capturing device during a standby mode, or a quick-view image which is provided to a user for review after capturing of an image.

21. The image capturing device of claim 20, wherein, in response to a shutter of the image capturing device being pressed by the user with the live-view image displayed in the second area, the control unit displays the quick-view image in the second area.

22. The image capturing device of claim 21, wherein, in response to user input being received with the quick-view image displayed in the second area, the control unit sets the quick-view image as a new reference image and controls the display unit to display the live-view image in the first area with the quick-view image displayed in the second area.

23. The image capturing device of claim 22, wherein, in response to a command being received from the user, the control unit controls the display unit to allow the reference image and the captured image to swap places with each other.

24. The image capturing device of claim 13, wherein the control unit crops a portion out of one of the reference image and the captured image in response to a user's manipulation of the image capturing device, and moves the cropped image portion over to the other one of the reference image and the captured image to edit the corresponding image.

25. An image capturing device, comprising:
   an image capturing unit to capture an image;
   a display unit which displays a reference image and a captured image, taken under different image capture conditions, in respective first and second adjacent areas of the display unit; and
   a control unit which controls generation of a first GUI including image capturing information regarding the reference image on one side of the first area and generation of a second GUI including image capturing information regarding the captured image on one side of the second area,
   wherein the first and second GUI indicate differing image capturing conditions between the reference image and the captured image,
   wherein the control unit displays icons corresponding to differences in image capturing conditions between the reference image in the first area and the captured image in the second area without displaying one or more first and second icons that represent identical image capturing conditions between the reference image in the first area and the captured image in the second area.

26. The image capturing device of claim 25, wherein the image capturing information includes resolution icons to provide resolution information of the reference image and the captured image.

27. The image capturing device of claim 26, wherein the control unit highlights the resolution icons corresponding to differences in the image capturing conditions.

28. The image capturing device of claim 26, wherein the icons represent image capturing information as text.

29. The image capturing device of claim 26, wherein the icons represent image capturing information as images.

30. The image capturing device of claim 25, further comprising:
   a user input unit to receive a command to generate a third GUI to allow a user to set a new reference image such that the control unit replaces the reference image with a new reference image.

31. The image capturing device of claim 30, wherein the user input unit includes touching an area in which a quick-view image displayed in the second area is touched for a predetermined amount of time, and the control unit controls the third GUI to display an option for the user to set the quick-view image as the new reference image.

* * * * *

UNITED STATES PATENT AND TRADEMARK OFFICE
CERTIFICATE OF CORRECTION

PATENT NO. : 9,088,712 B2
APPLICATION NO. : 13/524221
DATED : July 21, 2015
INVENTOR(S) : Kyoung-soo Son Page 1 of 1

It is certified that error appears in the above-identified patent and that said Letters Patent is hereby corrected as shown below:

On the title page, item 56 col. 2, Other Publications, delete "Wikipeda" and insert --Wikipedia--, therefor.

Signed and Sealed this
Thirteenth Day of October, 2015

Michelle K. Lee
*Director of the United States Patent and Trademark Office*